United States Patent [19]
Briggs

[11] Patent Number: 5,574,672
[45] Date of Patent: Nov. 12, 1996

[54] COMBINATION MULTIPLIER/SHIFTER

[75] Inventor: Willard B. Briggs, Dallas, Tex.

[73] Assignee: Cyrix Corporation, Richardson, Tex.

[21] Appl. No.: 331,232

[22] Filed: Oct. 21, 1994

Related U.S. Application Data

[63] Continuation of Ser. No. 951,217, Sep. 25, 1992, abandoned.
[51] Int. Cl.$^6$ .............................. G06F 5/01; G06F 7/52
[52] U.S. Cl. ..................... 364/715.08; 364/960
[58] Field of Search .................... 364/715.08, 760, 364/754, 748, 736

[56] References Cited

U.S. PATENT DOCUMENTS

| | | | |
|---|---|---|---|
| 5,220,525 | 6/1993 | Anderson et al. | 364/760 |
| 5,251,167 | 10/1993 | Simmonds et al. | 364/760 |
| 5,262,976 | 11/1993 | Young et al. | 364/760 |

*Primary Examiner*—David H. Malzahn
*Attorney, Agent, or Firm*—Andrew S. Viger; John L. Maxin

[57] ABSTRACT

A combination multiplier/shifter circuit (FIG. 2) can be used to implement an arithmetic or execution unit, using the multiplier/shifter to perform both multiplication operations and shift operations (such as for alignment or normalization). The arithmetic unit includes separate multiplier and adder channels. The multiplication channel includes a Multiplier/Shifter Circuit (10) with both multiplication and shift logic. The multiplication logic comprises an Adder Tree 12 with a rectangular aspect ratio (71×12) and Booth Recoder Logic 14, and implements conventional Booth recoded multiplication. The shift logic comprises Shift Control Logic 20 and Shift Extender Logic 32. For multiplication operations, redundant partial/final products MS1 and MS2 (sum and carry) are generated as the multiplication output, with conversion to nonredundant partial products, and the addition of partial products to obtain a final product, being performed in the adder channel. For shift operations, right and left variable shift operations of 0+14 16 bits are implemented in response to a 5 bit shift count, with the Multiplier/Shifter Circuit performing variable right shifts of 0–16 bits (such as for alignment)—variable left shifts of 0–16 bits (such as for normalization) are performed by first performing an 8 or 16 bit fixed left shift using separate shift logic, and then if necessary, shifting back right by a variable amount in the Multiplier/Shifter Circuit.

15 Claims, 4 Drawing Sheets

COMBINATION MULTIPLIER/SHIFTER

The present application is a file wrapper continuation of application Ser. No. 07/951,217, filed Sep. 25, 1992 now abandoned.

TECHNICAL FIELD OF THE INVENTION

The invention relates generally to digital electronic devices, and more particularly, relates to a combination multiplier/shifter circuit.

In one aspect of the invention, the multiplier/shifter circuit is used in a floating point unit (FPU) to eliminate the need for a barrel shifter to handle alignment operations.

BACKGROUND OF THE INVENTION

Although mathematical functions can be performed in an arithmetic logic unit using only addition, subtraction, and shift operations, some processors, and in particular some numeric coprocessors or floating point units (FPUs), incorporate multiplier circuits in the arithmetic (or execution) unit to more efficiently perform certain multiplication and other mathematical functions such as division, square root, and transcendentals (sine, cosine, etc.).

Without limiting the scope of the invention, this background information is provided in the context of a specific problem to which the invention has application: reducing the amount of circuitry required to implement the arithmetic unit of an FPU.

FIG. 1a illustrates a conventional implementation of an FPU arithmetic unit incorporating a multiplier circuit. The arithmetic unit includes two channels: a multiplier channel and an adder channel. The multiplier channel includes a Booth-recoded multiplier that provides redundant outputs, and a converter for converting those redundant outputs into the final nonredundant result by performing a full ripple carry operation. The adder channel includes a barrel shifter for aligning the input operands, an adder circuit, and a normalizer circuit for performing a shift operation to eliminate leading zeros and provide a normalized output.

FIG. 1b illustrates an FPU arithmetic unit in which the converter circuitry has been eliminated from the multiplier channel. Instead, the redundant outputs of the multiplier circuit are input to a three input adder. For multiplication, the two operands are input to the multiplier and, for each pass through the multiplier, the adder performs addition with a full ripple carry (including, if necessary, partial product addition). For addition, one operand is input to the multiplier, multiplied by one, and input to the adder, while the second operand is aligned in the barrel shifter (right or left shift) and also input to the adder which performs the addition of the two operands.

Thus, the design for the arithmetic unit in FIG. 1b is able to eliminate the converter by using a somewhat more complex three input adder and adding some associated control logic. However, this design still includes the barrel shifter in the adder channel which adds a substantial amount of logic and complexity to the design of the arithmetic unit.

Accordingly, a general object of the invention is to provide a design for an arithmetic unit that requires less circuitry than current designs, specifically by eliminating the barrel shifter in the adder channel.

SUMMARY OF THE INVENTION

The invention is a combination multiplier/shifter circuit for selectably performing multiplication and shift operations, such as for use in an arithmetic unit.

In one aspect of the invention, the multiplier/shifter circuit comprises multiplication logic and shift logic. The multiplication logic includes an adder array for multiplying a multiplicand and a multiplier. Shifted values of the multiplicand, each equal to a successive power of two times the multiplicand, are selectable at the inputs to the adder array—multiplication is performed by using the multiplier to select the appropriate shifted multiplicands to be added in the adder array, providing a multiplication output from the multiplier/shifter circuit.

For a shift operation, a shift operand is input to the multiplication logic at the multiplicand input. The shift logic receives a shift count, and in response (a) selects the input to the adder array that receives the shifted multiplicand with a shift value corresponding to the shift count, and (b) causes all other inputs to the adder array to be set to zero. The result of selecting the appropriate adder input is to effect a shift operation in which the shift operand is shifted by the shift count, providing a shift output from the multiplier/shifter circuit.

In another aspect of the invention, the multiplier/shifter circuit in combined with a three-input adder to implement an arithmetic unit.

The multiplier/shifter circuit provides redundant sum and carry outputs MS1 and MS2. The three-input adder has an addend input, and receives as its other two inputs the MS1 and MS2 outputs of the multiplier/shifter circuit—it provides a full ripple carry addition output. Shift operations are performed as described above, with the shift output being provided as the sum output MS1 of the multiplier/shifter circuit (the carry output MS2 is zero).

For addition operations, a first addend is input to the three-input adder at the addend input, while a second addend is first alignment shifted in the multiplier/shifter circuit and then input to the MS1 input to the three-input adder. For multiplication operations, the multiplier/shifter circuit provides redundant multiplication outputs MS1 and MS2 to the three-input adder, which also receives as the first addend either the value zero or a previous partial product (or sum of previous partial products), and performs an addition with full ripple carry to obtain a partial or final product.

In an exemplary embodiment of the invention, the arithmetic unit is used in a floating point unit.

The multiplication logic in the multiplier/shifter circuit is a 71×12 bits rectangular aspect ratio Booth-recoded multiplier. Recoder logic recodes the multiplier to provide control signals for the adder inputs to the adder array (i.e., the input of the appropriate shifted multiplicands based on the recoded multiplier). The shift logic comprises shift decoder logic and a multiplexer the shift decoder logic decodes the shift count to provide adder-input control signals. The multiplexer selects between (a) for multiplication operations, the control line outputs of the recoder logic, and (b) for shift operations, the control line outputs from the shift decoder logic.

The multiplier/shifter circuit performs variable right or left shifts of 0–16 bits—in general, variable right shifts are used for addend alignment, while variable left shifts are used for normalization. Two shift mechanisms are used to implement variable right shifts: (a) a variable right shift of 0–8 bits, and (b) a fixed right shift of either 0 or 8 bits using shift extender logic added to the multiplier/shifter circuit at the MS1 output. Variable left shifts are performed by first performing a fixed left shift of 8 or 16 bits using shift select logic, and then performing a variable right shift of 0–7 bits.

The shift select logic is located in the adder channel of the arithmetic unit at the output of the three-input adder. In addition to providing the fixed left shifts of 8 or 16 bits used in performing variable left shifts in the multiplier/shifter circuit, the shift select logic performs selected fixed shifts without having to go through the multiplier/shifter circuit (thereby speeding up shifting operations, or allowing concurrent multiplication operations), including: (a) right shift by 12 bits, used for partial product shifting (12 bits being the width of the exemplary multiplication logic) so as to allow the multiplier to generate the next partial product; and (b) right shift by one, which is a common shift (such as for adder overflow).

The technical advantages of the invention include the following. The combination multiplier/shifter circuit has general application to circuits for implementing multiplication and shifting operations. The multiplier/shifter circuit can perform variable right and left shifts, such as for exponent/mantissa extraction, alignment, partial product shifting, or normalization. In particular, the multiplier/shift circuit can be used in an execution or arithmetic unit to provide multiplication and addition channels without requiring either a full-ripple-carry converter in the multiplication channel or a barrel shifter in the adder channel—for multiplication operations, the three-input adder provides full ripple carry conversion of the redundant multiplication outputs, while for addition operations, the multiplication/shift logic performs the necessary alignment shift operations. Shift select logic (significantly less complex than a barrel shifter) can be included to provide selected fixed shift operations, such as for speeding selected shift operations, or permitting concurrent use of the multiplier/shifter circuit. Latching of inputs and outputs of the arithmetic unit permit pipelining of multiplication, addition, and shifting operations.

For a more complete understanding of the invention, and for further features and advantages, reference is now made to the Detailed Description of an exemplary embodiment of the invention, together with the accompanying Drawings, it being understood that the invention encompasses any modifications or alternative embodiments that fall within the scope of the claims.

DETAILED DESCRIPTION OF THE INVENTION

The detailed description of an exemplary embodiment of the combination multiplier/shifter circuit is organized as follows:

1. Multiplier/Shifter Circuit
1.1. Multiplication Logic
1.2. Shift Logic
1.3. Modified Adder Tree
2. Arithmetic Unit
2.1. Shift Operations
2.2. Multiplication Operations
2.3. Addition Operations
3. Conclusion
Appendix—Shift Control This organizational table, and the corresponding headings used in this Detailed Description, are provided for convenience of reference only.

The exemplary combination multiplier/shifter circuit is used to implement an arithmetic logic unit in a floating point unit (FPU), which can be either external or internal to a microprocessor. Applicant has not burdened this Detailed Description with implementation details that are not required to provide an enabling disclosure for the exemplary multiplier/shifter circuit (such as, register sizes, Booth recoding details including the handling of negative partial products, and flagging operations that shift bits off the least significant end of the floating point mantissa).

Figure 1A:
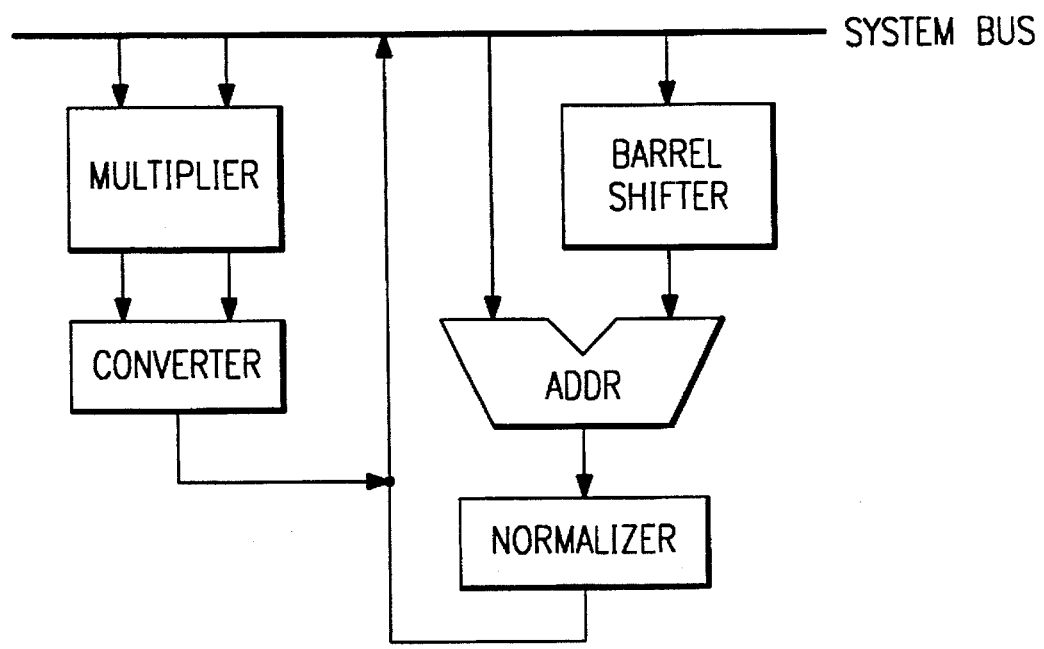
FIGS. 1a and 1b illustrate prior art arithmetic units including a multiplier circuit and a barrel shifter.
Figure 1B:
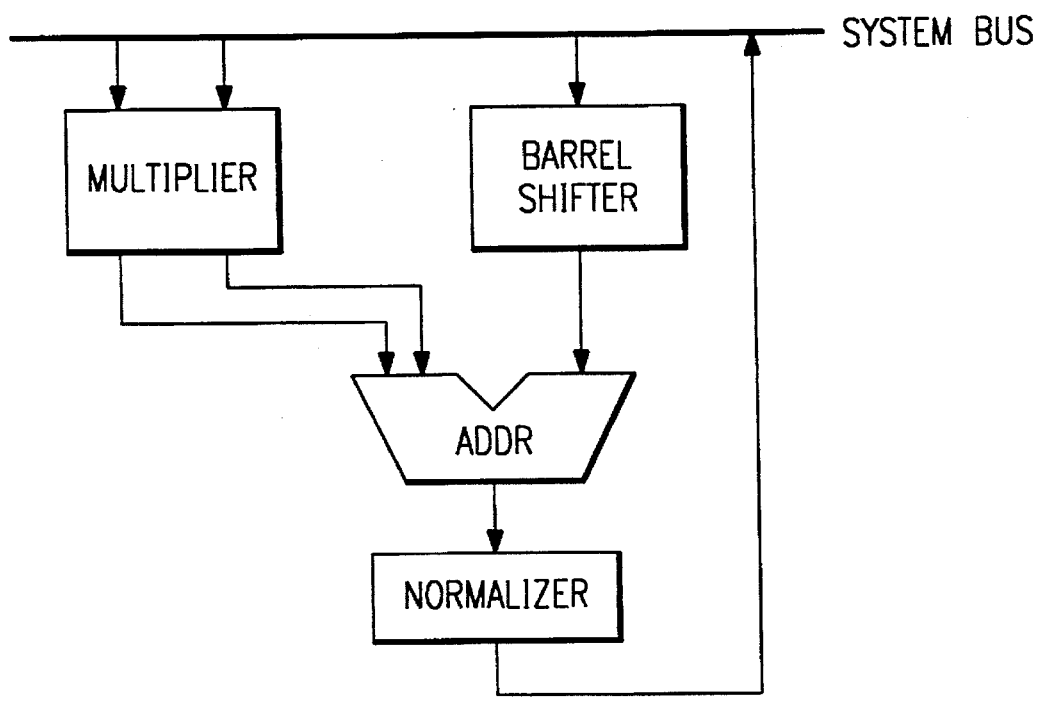
Figure 2:
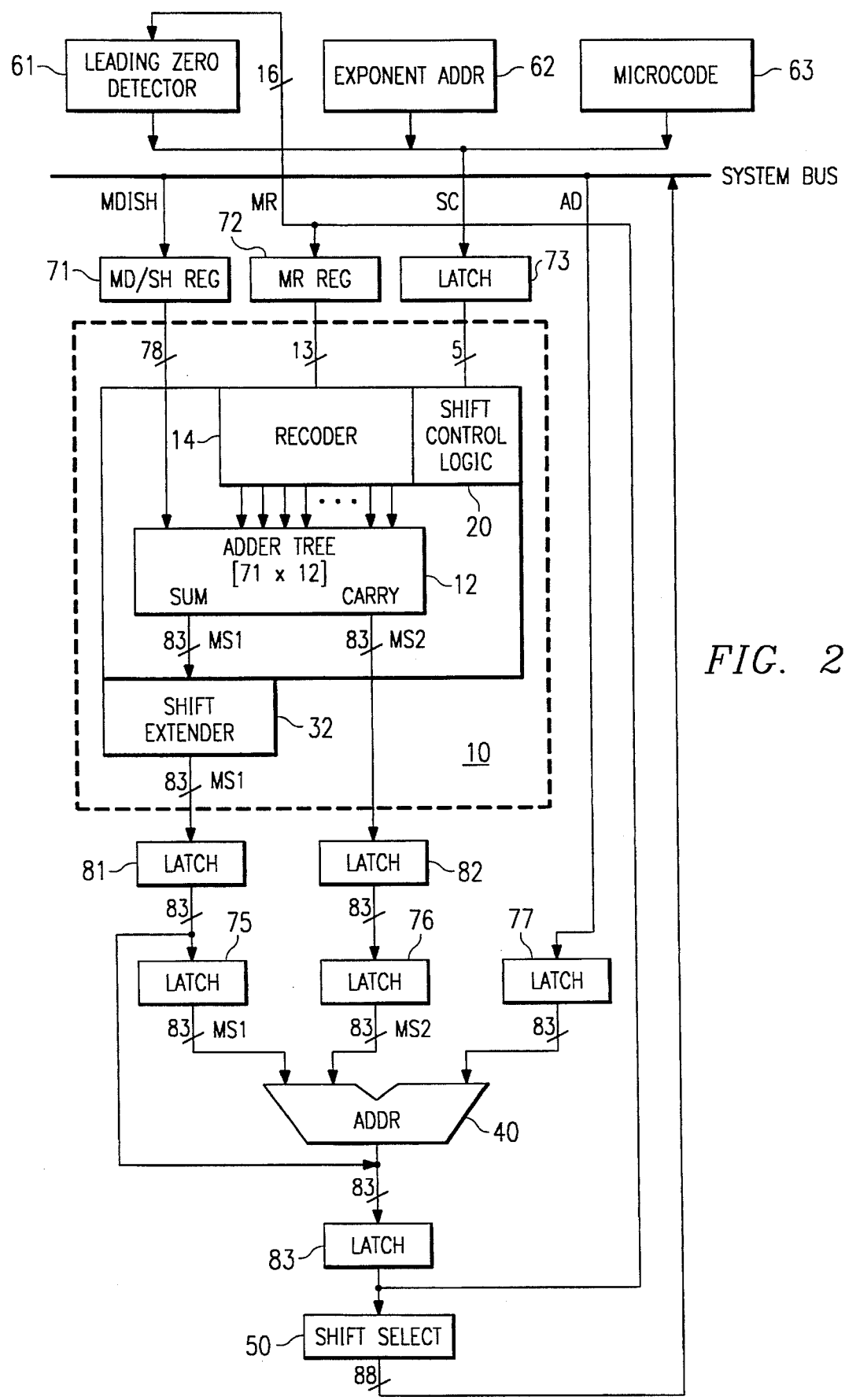
FIG. 2 illustrates the exemplary embodiment of the combination multiplier/shifter circuit of the invention.

1. Multiplier/Shifter Circuit. FIG. 2 illustrates the exemplary implementation of the multiplier/shifter circuit in an arithmetic unit. The arithmetic unit includes separate multiplier and adder channels, with data transfers to and from the arithmetic unit occurring over a System Bus. The differentiation between multiplication and adder channels, and the inclusion of logic functions in one channel or the other is for convenience of description only.

The multiplication channel includes a Multiplier/Shifter Circuit 10 with both multiplication and shift logic. The multiplication logic comprises an Adder Tree 12 with a rectangular aspect ratio (71×12) and Booth Recoder Logic 14(a)–(f), and implements conventional Booth recoded multiplication. The shift logic comprises Shift Control Logic 20 and Shift Extender Logic 32, and implements shift operations in accordance with the invention.

For multiplication operations, the multiplication logic receives a 71 bit multiplicand MD and a 71 bit multiplier MR through respective registers MD/SH and MR. The multiplier is input to the Recoder in segments to accommodate the 12 bit width of the multiplier (see Section 1.1). The MD/SH register is 78 bits wide to accommodate 78 bit shift operands, which are extended 7 bits at the most significant end to provide for left overshifts (see Section 1.2)

In each pass through the multiplication logic, redundant 83 bit partial/final products MS1 and MS2 (sum and carry) are generated as the multiplication output. For the exemplary implementation of the Multiplier/Shifter Circuit in an arithmetic unit, the conversion to nonredundant partial products, and the addition of partial products to obtain a final product, is performed in the adder channel (see Section 2).

For shift operations, the Multiplier/Shifter Circuit receives a 78 bit shift operand SH through the MD/SH register. Right and left variable shift operations of 0–16 bits are implemented in response to a 5 bit shift count SC, with the direction of the shift being determined by a left-shift/right-shift control signal. The exemplary Multiplier/Shifter Circuit performs variable right shifts of 0–16 bits (such as for alignment)—variable left shifts of 0–16 bits (such as for normalization) are performed by first performing an 8 or 16 bit fixed left shift using separate shift logic (see Section 2), and then if necessary, shifting back right by a variable amount in the Multiplier/Shifter Circuit.

Figure 3:
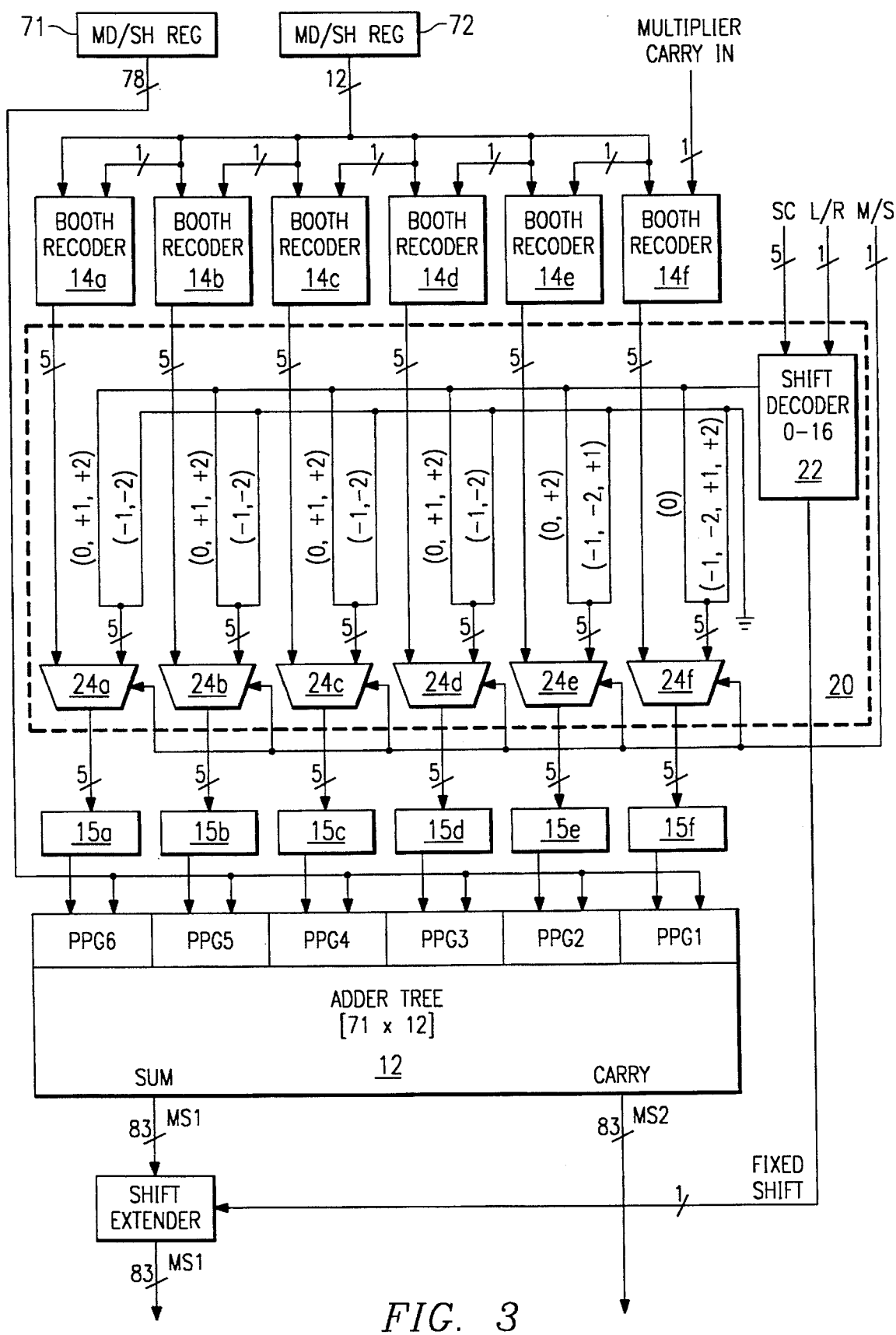
FIG. 3 illustrates an exemplary implementation of the shift logic for use with a Booth recoded multiplier.

FIGS. 3 illustrates the combination of multiplication and shift logic in the Multiplier/Shifter Circuit in greater detail.

1.1 Multiplication Logic. The multiplication logic comprises Adder Tree 12 together with Recoder Logic 14(a)–(f) and an Adder Tree Input Latch 15(a)–(f). The Input Latch is used to facilitate pipelining—after recoding a multiplier segment, the Recoder can begin recoding the next multiplier segment without waiting for the Adder Tree to complete generation of the previous partial product.

The 71 bit multiplicand MD from the MD/5H Register is input to each of six partial product generators PPG6-PPG1 in the Adder Tree 12. The Partial Product Generators generate shifted values of the multiplicand, each equal to a successive power of two times the multiplicand—these shifted multiplicands are input to the Adder Tree.

The multiplier MR is output from the MR Register in 13 or 12 bit segments using a multiplexer (not shown)—in accordance with conventional Booth recoding, each segment includes the most significant bit (MSB) of the previous segment (for the first segment, this bit is forced to zero). These multiplier segments are input to the Recoder Logic 14(a)–(f) to initiate the generation of successive partial products in successive passes through the multiplication logic.

Specifically, the Recoder Logic indicates the appropriate shift amount for each multiplicand, the shifted multiplicand being subsequently input to and added in the Adder Tree. The exemplary Booth recoding scheme uses a –2,–1,0,+1,+2 recoding of the input multiplier segments, providing five corresponding control signals to the Partial Product Generators to control the inputs to the Adder Tree—thus, the Recoder has a total of 30 control line outputs, five for each of the Partial Product Generators.

The resulting redundant 83 bit partial products are output as sum and carry outputs MS1 and MS2. The 83 bit Booth recoded multiplication output— 71 bits plus 12 bits—comprises 81 data bits plus a sign bit and an overflow bit. These partial product outputs are input to the adder channel of the arithmetic unit for conversion to nonredundant format and partial/final product addition (see Section 2).

1.2. Shift Control Logic. The, Shift Control Logic 20 comprises a Shift Decoder 22 and a Multiplexer 24(a)–(f). The Shift Control Logic implements variable right and left shifts of 0–16 bits in response to the shift count SC and the control signals L/R (left/right) and M/S (multiply/shift).

The Multiplexer is introduced into the signal path between the Recoder 14(a–(f) and the Partial Product Generators PPG6-PPG1 of the Adder Tree—in response to the M/S control signal, the Multiplexer selects for input the Partial Product Generators either: (a) for multiplication operations, control inputs from the Recoder Logic, or (b) for shift operations, control inputs from the Shift Decoder.

Two shift mechanisms are used to implement variable right shifts of 0–16 bits: (a) a variable right shift of 0–8 bits performed in the Adder Tree 12, and (b) a fixed right shift of either 0 or 8 bits performed by Shift Extender Logic 32. For the exemplary embodiment, variable left shifts of 0–16 bits are accomplished by first performing a fixed left shift of 8 or 16 bits using separate shift logic located in the adder channel of the arithmetic unit (see Section 2), and then if this shift results in an overshift, performing a variable right shift of 0–7 bits in the Multiplier/Shifter Circuit.

To implement variable right or left shifts of 0–8 bits, the Shift Decoder 22 decodes the shift count SC and the left/right L/R control signal, and provides corresponding variable-shift control inputs to the Partial Product Generators PPG6-PPG2 through the Multiplexer. Specifically, a variable shift of 0–8 bits is effected by (a) selecting the Partial Product Generator output for which the shift operand has a shift value corresponding to the shift count, and (b) setting all other inputs to the Adder Tree to be set to zero.

Tables 1 and 2 given in the Appendix illustrate the exemplary implementation of the Shift Decoder, and in particular the generation of the variable-shift control signals for the Partial Product Generators. Note that only 14 variable-shift control lines are required—three each for PPG6-PPG3 (0,+1,+2) and two for PPG2 (0,+2). All other control lines to the Partial Product Generators are forced to zero by the Multiplexer (in particular, no control lines are required for PPG1).

As a result of the selection of an appropriate Partial Product Generator output, the shift operand is shifted by the shift count and output from the Adder Tree as a shift output MS1 (the carry output MS2 is zero for shift operations).

The variable right shift of 0–8 bits is extended to a 0–16 bit variable shift using the Shift Extender 32. The Shift Extender receives the shift output MS1 from the Adder Tree, and in response to the 1 bit fixed-shift selector from the Shift Decoder, selects either a 0 or 8 bit fixed right shift.

The 12 bit width of the exemplary multiplication logic allows a shift range of 0–11 bits—the 8 bit fixed shift from the Shift Extender extends this shift range to 0–19 bits. To reduce the complexity, only 9 of the 16 bits of shift range available from 4 bits of the shift count (i.e., a shift range of 0–8 bits) were implemented, reducing the shift range to 0–16 bits (i.e., the 0–8 variable shift together with a fixed shift of either 0 or 8 bits).

Shifts of more than 16 bits are accomplished by the combination of a variable shift of 0–16 bits, and the appropriate number of fixed 16 bit shifts.

1.3. Modified Adder Tree. From above, variable left shifts of 0–16 bits are performed by first shifting left by 8 or 16 bits, and then if that fixed shift results in an overshift, shifting back right by 0–7 bits. As a result, this left shift operation may result in up to 7 bits of the result being overshifted out of the most significant end of the shift operand.

For the exemplary implementation of the Multiplier/Shifter Circuit, the extended 78 bit MD/SH Register can accommodate a shift operand with an additional 7 bits of left overshift on the most significant end of the nominal 71 data bits. In addition, the 71×12 bit Adder Tree is modified to accommodate the extended length of the 78 bit shift operand.

Figure 4A:
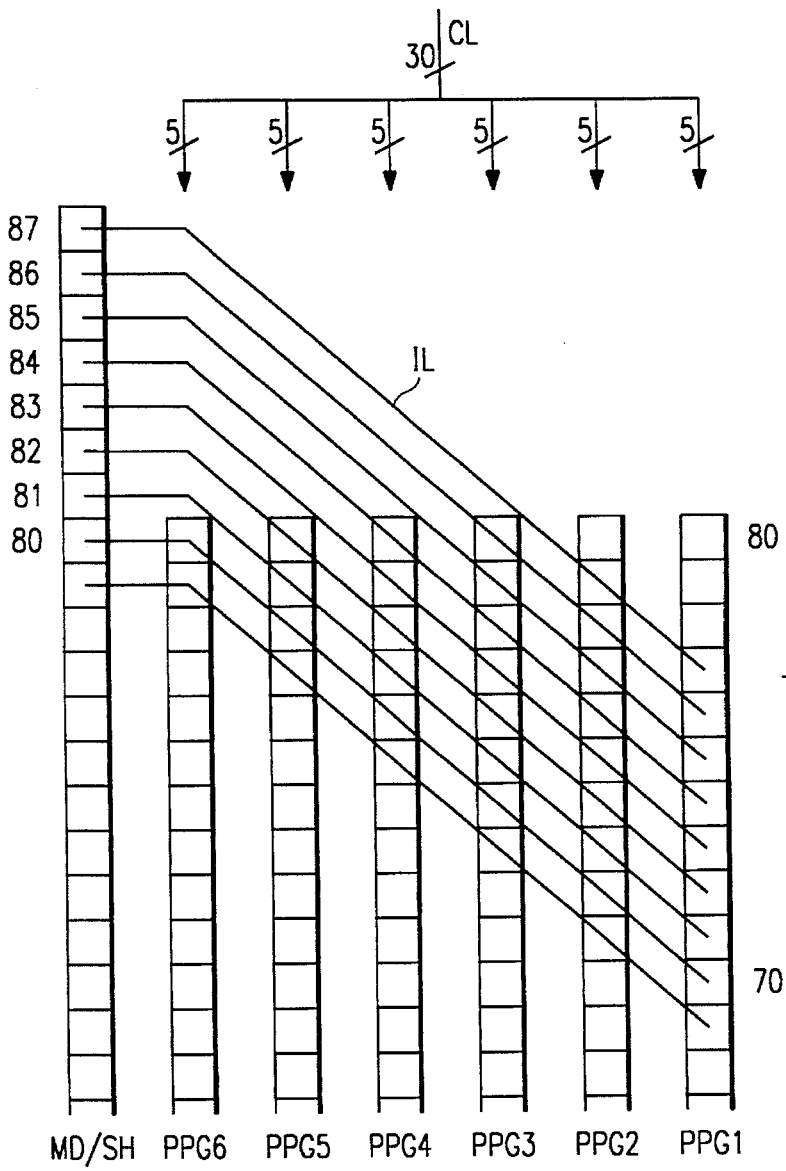
FIGS. 4a and 4b illustrate the extension of the partial product generators to accommodate shift operations using a shift operand larger than the normal multiplicand input.
Figure 4B:
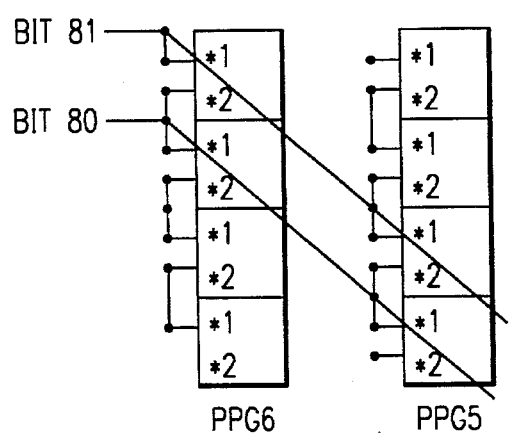

FIGS. 4a and 4b illustrates the exemplary approach to modifying the Adder Tree to accommodate the 78 bit shift operand. Specifically, FIG. 4a illustrates the layout of the Partial Product Generators PPG6-PPG1 in conjunction with the MD/SH Register that holds the 78 bit shift operand (and the 71 bit multiplicand), with each Partial Product Generator being shifted two bit positions. The adders of the Adder Tree are not shown.

The MD/SH Register is coupled to respective single-bit PPG elements via input lines IL. Each Partial Product Generator receives 5 of the 30 control lines CL from either the Recoder Logic 14(a)–(f) or the Shift Decoder through the Multiplexer (see FIG. 3). FIG. 4b provides a more detailed illustration of the connection of the PPG input lines IL to the PPG elements in accordance with conventional Booth recoding.

The System Bus for the arithmetic unit is an 88 bit data path (see Section 2) that comprises (a) 7 most significant bits [87:81] for left overshift, (b) 71 bits of data [80:10], and (c) 10 least significant bits [9:0] used to flag data shifted off the least significant end. The most significant 78 bits [87:10]—7 bits of left overshift and 71 bits of data—comprise the shift operand loaded into the MD/SH Register.

To permit the Adder Tree to be used in right shifting the extended shift operand, the Partial Product Generators PPG5-PPG1 are each extended at the most significant end by the addition of enough single-bit PPG elements and associated adders to extend the Partial Product Generator to the bit 80 data line (the added single-bit PPG elements are shown shaded in the drawing). Thus, PPG5 is extended by two single-bit PPG elements, while PPG1 is extended by ten single-bit PPG elements (PPG6 is not extended). The adders of the Adder Tree are correspondingly extended.

The additional PPG elements that extend the Partial Product Generators PPG5-PPG1 receive inputs from the extended bits [87:81] of the MD/SH Register in the same manner that inputs from data bits [80:10] are applied to the Partial Product Generators (see FIG. 4b). Those added PPG elements of PPG2 and PPG1 that do not receive any inputs from the MD/SH Register are tied to ground.

Referring to the Tables in the Appendix, and the corresponding discussion of the generation of the variable-shift control signals in Section 1.2, because shift operations do not use all of the shift options available from the Partial Product Generators (using only 0–1–2 or 0–2), the extension of the Adder Tree could be accomplished without using full single-bit PPG elements (which would not be used for normal multiplication operations involving nominal 71 bit multiplicands). However, for the exemplary implementation of the Adder Tree, simply replicating the full single-bit PPG elements used in the Partial Product Generators was a more straightforward approach than designing special purpose adders, and did not result in using die space that could have been used for other purposes.

2. Arithmetic Unit. Referring to FIG. 2, the exemplary implementation of an FPU arithmetic unit using the Multiplier/Shifter Circuit will now be described. The Multiplier/Shifter Circuit 10 forms the multiplier channel, while the adder channel includes a Three-Input Adder 40 and Shift Selection Logic 50.

The Three-Input Adder receives as inputs (a) an 83 bit addend AD from the system bus, and (b) the two 83 bit outputs MS1 and MS2 from the Multiplier/Shifter Circuit 10. The Three-Input Adder performs full ripple carry addition—as used in this Detailed Description, a ripple carry adder is any adder that produces a nonredundant result, which may be a simple adder, but is usually implemented using faster carry select or carry lookahead adders. The Three-Input Adder provides an 83 bit addition output corresponding to 81 bits of data plus shift and overflow.

The Shift Select Logic is included at the output of the three-input adder to select specified shift options that either implement left shifts in conjunction with the Multiplier/Shifter Circuit, or perform selected common right shifts so as to avoid having to go through the Multiplier/Shifter Circuit (see Section 2.1). The Shift Select Logic has the full 88-bit width of the System Bus, comprising 7 bits on the most significant end used for left overshifts, 71 data bits, and 10 bits on the least significant end used to flag shift operations that shift data off the least significant end (thereby losing accuracy).

The 5 bit shift count SC used by the Shift Control Logic 20 is generated by either a leading zero detector 61 (used for normalization shifts) or an exponent adder (used for addend alignment shifts)—alternatively, an arbitrary shift count can be input by microcode (such as for exponent/multiplicand extraction). The leading zero detector receives the most significant 16 bits of the addition output from the Three-Input Adder.

Synchronization and pipelining for the arithmetic unit are accomplished using input and output latches. The input latches are: (a) at the input to the Multiplier/Shifter Circuit, the MD/SH Register 71, the MR Register 72, a shift count latch 73, and (b) at the input to the Three-Input Adder, input latches 75, 76, and 77. The output latches are flow-through latches 81 and 82 for the two outputs MS1 and MS2 of the Multiplier/Shifter Circuit (which outputs flow through to the MS1 and MS2 input latches 75 and 76), and an adder latch 83 at the output of the Three-Input Adder.

The MD/SH Register latches multiplicands and shift operands from the System Bus, while the MR Register is loaded via the adder latch 83 at the output of the Three-Input Adder. Thus, a multiplier value is input from the system bus through the Three-Input Adder and the adder latch to the MR Register—this arrangement permits the multiplier to be loaded using a different clock than the System Bus.

The MS1 output latch, which during shift operations holds the shift output from the Multiplier/Shifter Circuit, feeds both the input latch 75 and the output latch 83 for the Three-Input Adder. For shift operations requiring multiple passes through the Multiplication/Shift Circuit, the intermediate shift operands output from the Multiplication/Shifter Circuit are input back into the MD/MS Register through the adder output latch 83 and the Shift Select Logic 50 over the System Bus, bypassing the Three-Input Adder.

The adder input latch 77 is loaded via the System Bus with either (a) an addend for addition operations, (b) a partial product (or intermediate sum of partial products) for multiplication operations, or (c) a multiplier to be passed through the Three-Input Adder and the adder output latch 83 to the MR Register. In addition, the adder input latch 77 can be loaded via a ROM (such as for rounding operations or to introduce constants during transcendental operations) or other latches (such as those used to accumulate/store values used in division operations).

2.1. Shift Operations. The exemplary arithmetic unit uses the Multiplier/Shifter Circuit 10 in the multiplier channel and/or the Shift Select Logic 50 in the adder channel to perform the various shift operations required for exponent/mantissa extraction, alignment, and partial product addition, and normalization, as well as other specialized shift functions such as for transcendental or division operations.

The variable shift operations performed by the Multiplier/Shifter Circuit are described in Section 1.2. The shift operand is loaded into the MD/SH Register from either: (a) an external source via the System Bus (such as for exponent/mantissa extraction or addend alignment), (b) the MS1 output latch at the sum output of the Multiplier/Shifter Circuit, through the adder output latch 81 and the Shift Select Circuit 50 (such as for shift operations requiring multiple passes through the Multiplier/Shifter Circuit), or (c) the Three-Input Adder and the Shift Select Logic (such as for normalization).

For the exemplary arithmetic unit, the fixed shift operations performed by the Shift Select Logic are: (a) fixed left shifts by 8 or 16 bits that allow the Multiplier/Shifter Circuit to implement variable left shifts, such as for normalization (see Section 1.2); (b) fixed right shift by 12 bits, used for partial product shifting (corresponding to the 12 bit width of the multiplication logic) so as to allow the multiplier to concurrently generate the next partial product; (c) right shift by one, which is a common shift (such as for adder overflow), and (d) a left shift by 11 bits, used to speed division operations as described in U.S. Pat. No. 5,046,038 assigned to the assignee of this invention. In addition to providing the fixed left shift used to implement variable left shifting in the Multiplier/Shifter Circuit, these specified shift options are used to speed up shifting operations, or allow concurrent multiplier operations.

2.2. Multiplication Operations. For multiplication operations, multiplication is performed in the Multiplication/Shifter Circuit 10, which provides redundant final/partial product outputs MS1 and MS2. The redundant multiplication outputs are input to the Three-Input Adder for nonredundant final/partial product generation.

If the output of the Multiplier/Shifter Circuit is a partial product, the Three-Input Adder 40 performs a full ripple carry conversion to nonredundant format, with the addition of the sum of previous partial products if necessary. The Shift Select Logic performs a right shift by 12 bits on the partial product output from the Three-Input Adder, while at the same time the Multiplier/Shifter is generating the next partial product.

When a nonredundant final product is output from the Three-Input Adder, the Shift Select Logic and the Multiplier/Shifter Circuit combine to perform a variable left shift for normalization, with the shift count being provided by the Leading Zero Detector 61.

2.3. Addition Operations. For addition operations, addition is performed in the adder channel using the Three-Input Adder, with alignment being performed by the Multiplication/Shifter Circuit.

The smaller of the two addends is input as a shift operand to the MD/SH Register, with the shift count being determined by the Exponent Adder 62. After the appropriate alignment shift operation, the aligned addend is output from the Multiplier/Shifter Circuit as the sum output MS1 and input to the Three-Input Adder (which receives the other addend from the System Bus).

The addition output from the Three-Input Adder is then normalized using the Shift Select Logic and the Multiplier/Shifter Circuit.

3. Conclusion. Although the Detailed Description of the invention has been directed to certain exemplary embodiments, various modifications of these embodiments, as well as alternative embodiments, will be suggested to those skilled in the art. For example, the invention has general applicability to implementing multiplication/shift operations. Also, shift directions depend on the radix point—for the exemplary floating point implementation, the radix point is in accordance with the IEEE standard, i.e., normalized between 1 and 2. Alternatively, an integer multiplier/shifter would have a radix point to the right of the least significant bit, so that variable right shifts would be implemented by a fixed right shift with a variable left shift. Or, the radix point could be set in the center to provide variable shifts in both directions without a fixed overshift.

The invention encompasses any modifications or alternative embodiments that fall within the scope of the claims.

TABLE 1

APPENDIX
SHIFT LOGIC
LEFT SHIFT CONTROL

| INPUT | OUTPUTS | | | | | | |
|---|---|---|---|---|---|---|---|
| Shift | Partial Product Generators Control Lines | | | | | | 8 bit |
| Count | PPG6 | PPG5 | PPG4 | PPG3 | PPG2 | PPG1 | Shift |
| 0 | 2 | 0 | 0 | 0 | 0 | 0 | 0 |
| 1 | 0 | 0 | 0 | 1 | 0 | 0 | 0 |
| 2 | 0 | 0 | 0 | 2 | 0 | 0 | 0 |
| 3 | 0 | 0 | 1 | 0 | 0 | 0 | 0 |
| 4 | 0 | 0 | 2 | 0 | 0 | 0 | 0 |
| 5 | 0 | 1 | 0 | 0 | 0 | 0 | 0 |
| 6 | 0 | 2 | 0 | 0 | 0 | 0 | 0 |
| 7 | 1 | 0 | 0 | 0 | 0 | 0 | 0 |
| 8 | 2 | 0 | 0 | 0 | 0 | 0 | 0 |
| 9 | 0 | 0 | 0 | 1 | 0 | 0 | 0 |
| 10 | 0 | 0 | 0 | 2 | 0 | 0 | 0 |
| 11 | 0 | 0 | 1 | 0 | 0 | 0 | 0 |
| 12 | 0 | 0 | 2 | 0 | 0 | 0 | 0 |
| 13 | 0 | 1 | 0 | 0 | 0 | 0 | 0 |
| 14 | 0 | 2 | 0 | 0 | 0 | 0 | 0 |
| 15 | 1 | 0 | 0 | 0 | 0 | 0 | 0 |
| 16 | 2 | 0 | 0 | 0 | 0 | 0 | 0 |

TABLE 2

RIGHT SHIFT CONTROL

| INPUT | OUTPUTS | | | | | | |
|---|---|---|---|---|---|---|---|
| Shift | Partial Product Generators Control Lines | | | | | | 8 bit |
| Count | PPG6 | PPG5 | PPG4 | PPG3 | PPG2 | PPG1 | Shift |
| 0 | 2 | 0 | 0 | 0 | 0 | 0 | 0 |
| 1 | 1 | 0 | 0 | 0 | 0 | 0 | 0 |
| 2 | 0 | 2 | 0 | 0 | 0 | 0 | 0 |
| 3 | 0 | 1 | 0 | 0 | 0 | 0 | 0 |
| 4 | 0 | 0 | 2 | 0 | 0 | 0 | 0 |
| 5 | 0 | 0 | 1 | 0 | 0 | 0 | 0 |
| 6 | 0 | 0 | 0 | 2 | 0 | 0 | 0 |
| 7 | 0 | 0 | 0 | 1 | 0 | 0 | 0 |
| 8 | 2 | 0 | 0 | 0 | 0 | 0 | 8 |
| 9 | 1 | 0 | 0 | 0 | 0 | 0 | 8 |
| 10 | 0 | 2 | 0 | 0 | 0 | 0 | 8 |
| 11 | 0 | 1 | 0 | 0 | 0 | 0 | 8 |
| 12 | 0 | 0 | 2 | 0 | 0 | 0 | 8 |
| 13 | 0 | 0 | 1 | 0 | 0 | 0 | 8 |
| 14 | 0 | 0 | 0 | 2 | 0 | 0 | 8 |
| 15 | 0 | 0 | 0 | 1 | 0 | 0 | 8 |
| 16 | 0 | 0 | 0 | 0 | 2 | 0 | 8 |

What is claimed is:

1. A combination multiplier/shifter circuit for selectably performing multiplication and shift operations, the multiplier/shifter circuit including an adder array in which multiplication operations are performed by inputting to the adder array appropriately shifted values of a multiplicand, each equal to plus or minus a successive power of two times the multiplicand, the multiplier/shifter circuit comprising:

multiplication logic, including selection logic and the adder array, coupled to receive, (i) for multiplication operations, a multiplier and the multiplicand, and (ii) for shift operations, a shift operand in place of the multiplicand; and shift logic, coupled to the selection logic and including shift count circuitry that provides a shift count representative of a shift in the shift operand, the shift logic being coupled to receive the shift count for each shift operation, wherein, for a multiplication operation, the selection logic is responsive to the multiplier to generate appropriately shifted values of the multiplicand for input to the adder array, which then provides a corresponding multiplication output; and for a shift operation, the shift logic is responsive to the shift count for causing the selection logic to generate a correspondingly shifted value of the shift operand for input to the adder array, such that the adder array provides a shift output corresponding to the shift operand shifted in accordance with the shift count.

2. The multiplier/shift circuit of claim 1, wherein the shift operation is performed by shifting the shift operand by a selected number of bits to the right so as to provide a variable right shift.

3. The multiplier/shift circuit of claim 2, further comprising fixed shift logic coupled to the multiplication logic for selectably shifting the shift operand by a fixed number of bits to the left so as to provide a variable left shift by performing a fixed left overshift and a variable right shift.

4. The multiplier/shift circuit of claim 3, wherein adders of the adder array are of sufficient width to accommodate fixed left overshift operations.

5. The multiplier/shift circuit of claim 3, wherein the shift operand is a floating point shift operand.

6. The multiplier/shift circuit of claim 1, wherein multiplication operations are performed using Booth recoding, and wherein:

the selection logic includes Booth recoding logic for performing normal Booth recoding during multiplication operations by recoding the multiplier input and providing corresponding multiplication control signals for controlling the generation of the appropriately shifted values of the multiplicand;

the shift logic includes shift decode logic for decoding, each shift operation, the shift count and providing corresponding shift control signals for controlling the generation of the shifted value of the shift operand corresponding to the shift count; and the multiplication logic includes a multiplexer coupled to receive the multiplication control and shift control signals, the multiplexer being responsive to a multiplication/shift select signal to select either the multiplication control or shift control signals for use by the selection logic.

7. The multiplier/shift circuit of claim 6, wherein the multiplication logic provides redundant multiplication outputs for multiplication operations, such that for shift operations, the multiplication logic outputs a shift output and a zero output.

8. The multiplier/shift circuit of claim 1, wherein the adder array comprises an adder tree.

9. An arithmetic unit including a combination multiplier/shifter circuit for performing multiplication and shift operations, the multiplier/shifter circuit including an adder array in which multiplication operations are performed by inputting to the adder array appropriately shifted values of a multiplicand, each equal to plus or minus a successive power of two times the multiplicand, the arithmetic unit comprising:

a three-input adder;

the multiplier/shifter circuit including multiplication logic and shift logic;

the multiplication logic receiving, for multiplication operations, a multiplier and the multiplicand, and for shift operations, a shift operand in place of the multiplicand;

the multiplication logic including selection logic and the adder array;

for a multiplication operation, the selection logic is responsive to the multiplier to generate appropriately shifted values of the multiplicand for input to the adder array, which then provides two corresponding redundant multiplication outputs;

the three-input adder receiving as inputs a first addend and the two redundant multiplication outputs from the multiplication logic, and providing a nonredundant adder output;

the shift logic, coupled to the selection logic and including shift count circuitry that provides a shift count representative of a shift in the shift operand, the shift logic receiving for each shift operation a shift count;

for a shift operation, the shift logic is responsive to the shift count for causing the selection logic to generate a correspondingly shifted value of the shift operand for input to the adder array, such that the adder array provides a shift output corresponding to the shift operand shifted in accordance with the shift count;

for addition operations, a second addend is input to the multiplication logic as a shift operand and alignment shifted prior to being input to the three-input adder, which also receives the first addend;

for multiplication operations, the three-input adder receives the redundant multiplication outputs and a first addend that is either the value zero or a multiplication partial product, and outputs a nonredundant final or partial product.

10. The arithmetic unit of claim 9, wherein the shift operation is performed by shifting the shift operand by a selected number of bits to the right so as to provide a variable right shift.

11. The arithmetic unit of claim 9, further comprising fixed shift logic coupled to the multiplication logic for selectably shifting the shift operand by a fixed number of bits to the left so as to provide a variable left shift by performing a fixed left overshift and a variable right shift.

12. The arithmetic unit of claim 11, wherein adders of the adder array are of sufficient width to accommodate fixed left overshift operations.

13. The arithmetic unit of claim 11, wherein the shift operand is a floating point shift operand.

14. The arithmetic unit of claim 9, wherein multiplication operations are performed using Booth recoding, and wherein:

the selection logic includes Booth recoding logic for performing normal Booth recoding during multiplication operations by recoding the multiplier input and providing corresponding multiplication control signals for controlling the generation of the appropriately shifted values of the multiplicand;

the shift logic includes shift decode logic for decoding, each shift operation, the shift count and providing corresponding shift control signals for controlling the generation of the shifted value of the shift operand corresponding to the shift count; and the multiplication logic includes a multiplexer coupled to receive the multiplication control and shift control signals, the multiplexer being responsive to a multiplication/shift select signal to select either the multiplication control or shift control signals for use by the selection logic.

15. The multiplier/shift circuit of claim 9, wherein the shift count circuitry comprises a leading zero detector, and an exponent adder.

* * * * *